(12) United States Patent
Okuno

(10) Patent No.: US 7,751,042 B2
(45) Date of Patent: Jul. 6, 2010

(54) RECURSIVE-REFLECTIVE PHOTOELECTRIC SENSOR

(75) Inventor: Motoharu Okuno, Ayabe (JP)

(73) Assignee: OMRON Corporation, Kyoto (JP)

( * ) Notice: Subject to any disclaimer, the term of this patent is extended or adjusted under 35 U.S.C. 154(b) by 357 days.

(21) Appl. No.: 11/873,581

(22) Filed: Oct. 17, 2007

(65) Prior Publication Data

US 2008/0180667 A1  Jul. 31, 2008

(30) Foreign Application Priority Data

Oct. 30, 2006  (JP) ............................. 2006-294301

(51) Int. Cl.
*G01J 4/00* (2006.01)
(52) U.S. Cl. .................................... 356/364
(58) Field of Classification Search ....................... None
See application file for complete search history.

(56) References Cited

U.S. PATENT DOCUMENTS 6,734,807 B2 * 5/2004 King ........................ 340/903
2005/0213471 A1 * 9/2005 Taguchi et al. ......... 369/109.02

FOREIGN PATENT DOCUMENTS

| DE | 19801632 | 5/1999 |
|----|----------|--------|
| JP | 60-160440 | 10/1985 |
| JP | 61-259189 | 11/1986 |
| JP | 63254774 | 10/1988 |
| JP | 63-294153 | 11/1988 |
| JP | 06-111694 | 4/1994 |
| JP | 09-257478 | 10/1997 |
| JP | 10-141956 | 5/1998 |
| JP | 2002279870 | 9/2002 |
| JP | 2003-096850 | 4/2003 |
| JP | 2006-021558 | 1/2006 |

OTHER PUBLICATIONS

Japan patent application No. 2006-294301, Office Action mailed Apr. 8, 2008.

\* cited by examiner

*Primary Examiner*—Tu T Nguyen
(74) *Attorney, Agent, or Firm*—Weaver Austin Villeneuve & Sampson LLP

(57) ABSTRACT

A recursive-reflective photoelectric sensor has a sensor main body and a recursive reflecting part. The sensor main body includes a light projecting part that projects first circularly polarized light and a light receiving part. When a mixture of the first circularly polarized light and second circularly polarized light which is differently polarized from the first circularly polarized light is incident to the light receiving part, only the second circularly polarized light is selectively passed. The recursive reflecting part reflects the first circularly polarized light by converting into reflected light that includes the second circularly polarized light.

12 Claims, 13 Drawing Sheets

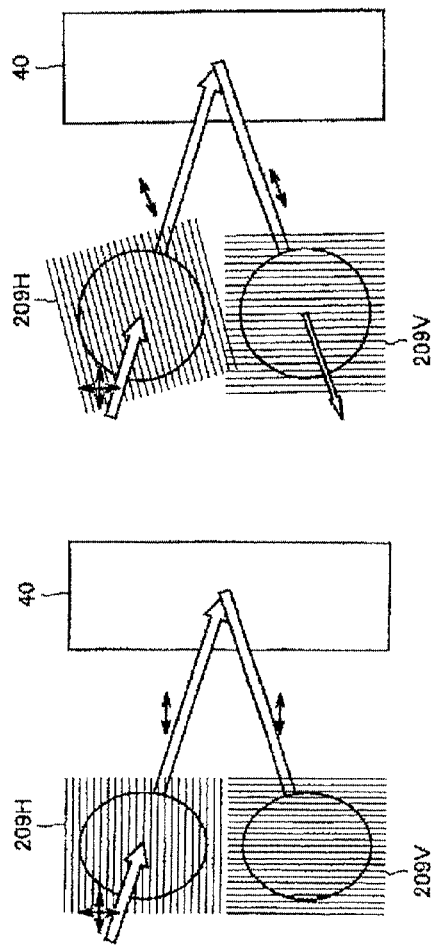
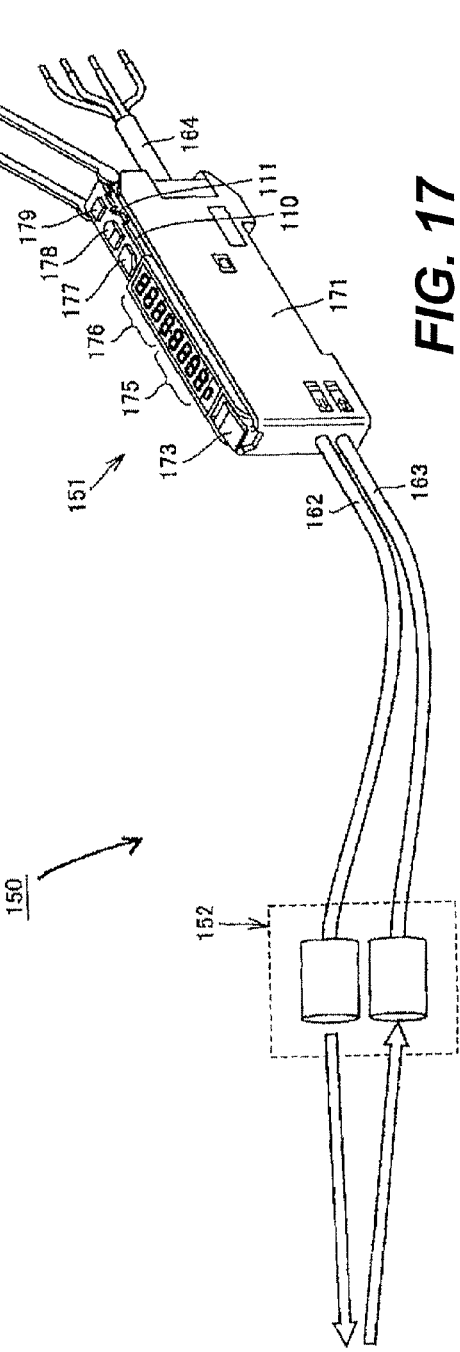
FIG. 16A
FIG. 16B
FIG. 17

RECURSIVE-REFLECTIVE PHOTOELECTRIC SENSOR

This application claims priority on Japanese Patent Application 2006-294301 filed Oct. 30, 2006.

BACKGROUND OF THE INVENTION

This invention relates to a photoelectric sensor of the recursive-reflective type, as well as its sensor main body and recursive-reflective part.

A recursive-reflective photoelectric sensor is a sensor comprised of a sensor main body provided with a light projecting and receiving optical system and a circuit system and a recursive-reflective plate (hereinafter referred to as the reflector). Recursive reflection means reflection of light such as in the case of a corner cube such that the reflected light is finally directed to the direction in which it was projected.

FIG. 21 shows an example of recursive-reflective photoelectric sensor actually in use, including its sensor main body 310 and its reflector 305. The reflector 305 reflects light that was projected from the light projecting part of the sensor main body 310, the reflected light being received by the light receiving part of the sensor main body 310.

Such a recursive-reflective photoelectric sensor may be used, for example, for detecting a target object 307 which is being transported on a conveyer 302 in a factory production line. When the target object 307 is between the sensor main body 310 and the reflector 305, the light from the sensor main body 310 to the reflector 305 is interrupted by the target object 307, and the presence of the target object 307 is detected because the projected light does not reach the light receiving part of the sensor.

FIG. 22 (consisting of FIGS. 22A, 22B, 22C and 22D) is a schematic drawing for explaining the detection operations of the recursive-reflective photoelectric sensor for target objects of different kinds.

FIG. 22A shows a situation in which projected light from the sensor main body 310 is directly reflected by the reflector 305 and the reflected light is directly received by the light receiving part of the sensor main body 310. In this situation, since the quantity of the reflected light that is received is sufficiently large, the output of the sensor is in the OFF condition.

FIG. 22B shows a situation in which projected light from the sensor main body 310 is reflected by a target object 307A which is a dispersive reflector, and dispersively reflected light is received by the light receiving part of the sensor main body 310. In this situation, the reflected light is weaker than in the case of reflection from the reflector 305. A drop in the quantity of received light is detected, and the output of the sensor is in the ON condition.

FIG. 22C shows a situation in which projected light from the sensor main body 310 is reflected by a target object 307B which is a mirror-surface reflector and reflected light is received by the light receiving part of the sensor main body 310. In this situation, reflected light therefrom is not much weaker than in the case of reflection from the reflector 305. Thus, when it is required to detect such a target object, the phenomenon of change in the polarization condition on the surface of the reflector 305 is made use of and the reflected light from such target object 307B is received through a polarization filter, as will be explained below with reference to FIGS. 23-25. By such a method, the drop in the quantity of received light can be detected even if the mirror-reflected light from the mirror-surface reflector 307 is being received by the light receiving part of the sensor main body 310, and the output of the sensor becomes the ON condition.

FIG. 22D shows a situation in which projected light from the sensor main body 310 passes through a transparent target object 307C, the transmitted light is reflected by the reflector 305 and the reflected light is received by the light receiving part of the sensor main body 310 after passing through the target object 307C again. In this situation, light becomes weaker each time it passes through the transparent object 307C, the drop in the quantity of received light is detected, and the output of the sensor becomes the ON condition.

The optical system of a recursive-reflective photoelectric sensor is frequently used for detecting a transparent object (such as glass or plastic objects), as shown in FIG. 22D. This is because light passes through the target object twice in the case of a recursive-reflective type and the attenuation of light can be easily detected although the drop in the light quantity each time light passed through the target object may not be very large.

A recursive-reflective plate of a corner cube array is generally used as the reflector of a recursive-reflective photoelectric sensor. In the case of a reflector of a corner cube array, polarization conversion takes place between the incident light and the reflected light.

FIG. 23, consisting of FIGS. 23A and 23B, shows a first example of polarization conversion that takes place on a reflector, and FIG. 24, consisting of FIGS. 24A and 24B, shows a second example of polarization conversion that takes place on a reflector.

FIGS. 23B and 24B each show the shape of a corner cube, forming a triangular pyramid by joining the 90-degree corners of three rectangular triangles at the top with the inner surfaces serving as light receiving surfaces. Thus, the three surfaces of each corner cube are mutually perpendicular. Such corner cubes are arranged on the reflector 305 without any gaps therebetween. The reflector, which is used for this photoelectric sensor, generally makes use of total reflection, and the polarization condition changes because there is a phase-shift at the time of total reflection between the vertical polarization and horizontal polarization.

FIGS. 23A and 23B each show the polarization condition of reflected light REF when vertically polarized light IN is incident. FIGS. 24A and 24B each show the polarization condition of reflected light REF when circularly polarized light IN is incident.

Conversion of polarization condition takes place in the case of a total-reflection reflector, vertical polarization being converted into horizontal polarization and circular polarization being converted to inverted circular polarization in the ideal situation. In real situations, however, an ideal conversion does not take place, as shown in FIGS. 23 and 24, and the reflected light becomes a mixture of light with a plurality of polarization conditions.

Next, FIG. 22 will be referenced again to explain some problem points related to reflected light. In the example of FIG. 22B, when the light projected from the sensor is screened by an object, the light reflected by this object becomes a problem. In this problem, the dispersively reflected light from the target object can be avoided by the difference in the reflectivity of the reflector or by a method of geometrical optics. In the case of a target object with a mirror surface as shown in FIG. 22C, another method is employed because the difference in reflectivity is small between the reflector and the target object. Such a method may be by controlling the polarization at the light projection and receiving parts of the sensor so as not to receive the regularly reflected light.

Optical systems of recursive-reflective photoelectric sensors may be largely divided into two types, the double-lens type with the light projecting and receiving parts having different optical axes and the coaxial type with the optical axes of the light projecting and receiving parts coinciding with each other. The common method for cutting off regularly reflected light from a target object as explained above with reference to FIG. 22C for both types of optical systems is to control polarization.

FIG. 25 shows an example of the structure of a sensor main body 310 of a double-lens type, comprised of a light projecting part and a light receiving part. The light projecting part includes a light emitting diode (LED) 311, a lens 316 and a polarization filter 319H. The light receiving part includes a polarization filter 319V, a lens 317 and a light receiving element 314. A photodetector (PD) is usually used as the light receiving element 314. The polarization direction of the polarization filter 319H is horizontal and that of the polarization filter 319V is vertical. In other words, a pair of polarization filters with mutually perpendicular polarization directions is employed.

Light that is emitted from the LED 311 passes through the polarization filter 319H to become polarized horizontally and is made incident to a target object. If there is no target object, it is reflected by the corner cube reflector, and polarized light with the direction of polarization vertically converted is passed through the polarization filter 319V and reaches the light receiving element 314. If a target object is present, since light that is regularly reflected by this object remains horizontally polarized, it is screened by the polarization filter 319V and does not reach the light receiving element 314.

As a result, the intensity of the light detected by the light receiving element 314 becomes lower when an object is present than when there is no object. Thus, detection of object becomes possible even if the object has a mirror-surface as in the case of FIG. 22C, since the intensity of light received by the light receiving element becomes lower due to the presence of the object.

FIG. 26 shows a first example of the structure of a sensor main body 410 of a coaxial type comprised of an LED 411, a polarization beam splitter 419, a lens 416 and a light receiving element 414.

Light that is emitted from the LED 411 is reflected by the polarization beam splitter 419 to become horizontally polarized and is made incident to a target object. It is reflected by a corner cube reflector if there is no target object, and light with the direction of polarization vertically converted passes through the polarization beam splitter 419 to reach the light receiving element 414. If a target object is present, light that is regularly reflected by the target object (shown by a broken line) remains polarized in the horizontal direction, is screened by the polarization beam splitter 419 and does not reach the light receiving element 414.

FIG. 27 shows a second example of the structure of a sensor main body 510 of a coaxial type comprised of an LED 511, polarization beam splitters 519H and 519V, a half mirror 519, a lens 516 and a light receiving element 514.

Light that is emitted from the LED 511 becomes horizontally polarized by the polarization filter 519H, is reflected by the half mirror 519 and is made incident to a target object. If there is no target object, the projected light is reflected by a corner cube reflector, and light with direction of polarization converted in the vertical direction passes through the half mirror 519 and the polarization filter 519V and reaches the light receiving element 514. If a target object is present, light that is regularly reflected by the target object (shown by a broken line) remains polarized in the horizontal direction, is screened by the polarization beam splitter 519V and does not reach the light receiving element 514.

Such optical systems for a recursive-reflective photoelectric sensor are described, for example, in Japanese Patent Publications Tokkai 2002-279870 and Tokko 6-93521.

Examples of object to be detected by a recursive-reflective photoelectric sensor includes transparent objects such as explained with reference to FIG. 22D. PET (polyethylene terephthalate) bottles that are commonly used as containers of drinks are also examples of such transparent object. In order to increase the attenuation of light by a PET bottle, it has been known to use a recursive-reflective photoelectric sensor by causing light to pass through a target object of detection twice.

In recent years, however, it is becoming difficult to reliably detect PET bottles by a photoelectric sensor. One of the problems in the detection of PET bottles by a recursive-reflective photoelectric sensor is that the transmissivity of PET bottles is high and attenuation of light does not take place easily. Since the PET bottles are becoming thinner recently, their transmissivity is becoming even higher. Another problem that is the shapes are becoming complicated and hence light is reflected and refracted to unexpected directions.

FIG. 28 is for explaining the effects of light reflection and convergence by a PET bottle. Light beam K1 emitted from the sensor main body 310 would travel straight as shown by arrow K2 but for the presence of a PET bottle 307 but it may be deflected in the converging direction towards the reflector 305 as shown by arrow K3, depending on the shape of the PET bottle 307. Another light beam K4 emitted from the sensor main body 310, on the other hand, would travel straight as shown by arrow K5 but for the presence of the PET bottle 307, but it may be reflected back towards the light receiving part by the surface of the PET bottle 307 as shown by arrow K6.

Light beam K7 reflected by the reflector 305 would travel straight as shown by arrow K8 but for the presence of the PET bottle 307 but may be deflected in a converging direction towards the light receiving part, as shown by arrow K9, depending on the shape of the PET bottle 307. Another reflected light beam K10 from the reflector 305 would travel straight and be attenuated as shown by arrow K13 but may be reflected by the surface of the PET bottle 307 as shown by arrow K12 and then travel towards the light receiving part as shown by arrow K13.

If such extra light enters the light receiving part, the light receiving part which is intended to detect very small attenuation of light tends to malfunction. In other words, sufficient attenuation of light cannot be obtained as target objects are made thinner, and the effects of converging light and reflected light give rise to the problem of erroneous operations.

If an attempt is made to make use of an optical system of a conventional kind adapted to screen off reflected light from a target object for detection, on the other hand, there arises the problem of double refractions by the PET bottle.

FIG. 29, consisting of FIGS. 29A and 29B, is for explaining this problem. As shown in FIG. 29A, light M1 emitted from a light source passes through a polarization filter such that the incident light IN towards the reflector is vertically polarized. Reflected light REF is polarization-converted and only its horizontally polarized component M2 is received by the light receiving part by its polarization filter. If a target object for detection is present in the detection area, the quantity of light that is received is normally less than the quantity of M2 and this is how the sensor detects the presence of the target object.

If the target object for detection is a PET bottle, as shown by light IN2 and REF2 in FIG. 29B, its double-refracting property may serve to convert the incomplete polarization conversion by the total reflector into an ideal condition of polarization conversion. In such a situation, the quantity of light M3 received by the light receiving part may be greater than that of M2. Thus, since the quantity of received light does not decrease, the sensor may fail to detect the presence of the PET bottle. In other words, although technologies exist for eliminating reflected light by using polarization, these technologies cannot be used because of the problem of double refractions by PET bottles and the incompleteness in polarization conversion by the reflector.

SUMMARY OF THE INVENTION

It is therefore an object of this invention to provide a technology of improving the reliability of detection by converting the double refracting property of PET bottles into the attenuation of light such that the problem of reflected light from PET bottles can be obviated.

Another object of this invention is to solve some of the problems related to conventional recursive-reflective photoelectric sensors.

A recursive-reflective photoelectric sensor according to this invention is characterized as comprising a sensor main body including a light projecting part that projects first circularly polarized light and a light receiving part that selectively receives, when a mixture of the first circularly polarized light and second circularly polarized light which is differently polarized from the first circularly polarized light is incident thereto, the second circularly polarized light and a recursive reflecting part that reflects the first circularly polarized light by converting into reflected light that includes the second circularly polarized light.

Preferably, in the above, the sensor main body includes a light projecting element, a light receiving element, a first phase-shift plate that converts first linearly polarized light into the first circularly polarized light and the second circularly polarized light into the first linearly polarized light, and a first polarization filter that is placed between the light receiving element and the first phase-shift plate on a optical path from the recursive reflecting part to the light receiving element and serves to selectively allow the first linearly polarized light therethrough.

In the above, furthermore, the sensor main body may be contained in a case provided with a light transmitting part that serves both as a light projecting window and a light receiving window, both the phase-shift plate and the first polarization filter may be positioned so as to cover the light transmitting part, the light receiving element may be positioned so as to receive light in a direction transverse to the light projecting direction of the light projecting element, and the sensor main body may further include a half mirror that serves to pass either projected light from the light projecting element and received light received by the light receiving element and to reflect the other of the projected light and the received light.

More preferably, the sensor main body may be contained in a case provided with a light projecting window and a light receiving window formed next to each other, and the first phase-shift plate and the first polarization filter may be both positioned so as to cover the light projecting window and the light receiving window.

Alternatively, the sensor main body may be contained in a case provided with a light projecting window and a light receiving window formed next to each other, the first phase-shift plate may be positioned so as to cover the light projecting window and the light receiving window, the first polarization filter may be positioned so as to cover the light receiving window, and the light projecting element may comprise a laser projecting element that projects the aforementioned first linearly polarized light.

Further alternatively, the light projecting element and the light receiving element may be disposed in an amplifier part, the first phase-shift plate and the first polarization filter may be disposed in a head part that is separate from the amplifier part, and the sensor main body may further include optical fibers that connect the amplifier part and the head part.

Still more preferably, the reflecting part may comprise a reflector that recursively reflects light, a second phase-shift plate that converts the first circularly polarized light into second linearly polarized light and the second linearly polarized light into the second circularly polarized light, and a second polarization filter that is placed between the second phase-shift plate and the reflector on an optical path from the light projecting element to the reflector and serves to selectively allow the second linearly polarized light to pass therethrough.

In another aspect, the present invention relates to a sensor main body of a recursive-reflective photoelectric sensor, characterized as comprising a light projecting element, a light receiving element, a phase-shift plate that converts linearly polarized light into first circularly polarized light and second circularly polarized light, which is differently polarized from the first circularly polarized light, into the linearly polarized light, and a polarization filter that is placed between the light receiving element and the phase-shift plate on an optical path from the recursive reflecting part to the light receiving element and serves to selectively allow the linearly polarized light to pass therethrough.

Preferably, the sensor main body is contained in a case provided with a light transmitting part that serves both as a light projecting window and a light receiving window, both the phase-shift plate and the polarization filter are positioned so as to cover the light transmitting part, the light receiving element is positioned so as to receive light in a direction perpendicular to the light projecting direction of the light projecting element, and the sensor main body further includes a half mirror that serves to pass either of projected light from the light projecting element and received light received by the light receiving element and to reflect the other of the projected light and the received light.

Alternatively, the sensor main body may be contained in a case provided with a light projecting window and a light receiving window formed next to each other and the phase-shift plate and the polarization filter may be both positioned so as to cover the light projecting window and the light receiving window.

Further alternatively, the sensor main body may be contained in a case provided with a light projecting window and a light receiving window formed next to each other, the phase-shift plate may be positioned so as to cover the light projecting window and the light receiving window, the polarization filter may be positioned so as to cover the light receiving window, and the light projecting element may comprise a laser projecting element that projects the linearly polarized light.

Still further alternatively, the light projecting element and said light receiving element may be in an amplifier part, the phase-shift plate and said polarization filter may be in a head part that is separate from said amplifier part, and the sensor main body may further include optical fibers that connect said amplifier part and said head part.

In still another aspect, the present invention relates to a recursive reflecting part of a recursive-reflective photoelectric sensor, characterized as comprising a reflector that reflects light recursively, a phase-shift plate that converts first circularly polarized light into linearly polarized light and the linearly polarized light into second circularly polarized light, and a polarization filter that is placed between the phase-shift plate and the reflector on an optical path from a sensor main body to the reflector and selectively passes the linearly polarized light therethrough.

The invention further relates to a recursive-reflective photoelectric sensor characterized as comprising a sensor main body provided with a light projecting part that projects first linearly polarized light and a light receiving part that selectively receives, when a mixture of second linearly polarized light, which is polarized differently from the first linearly polarized light, and the first linearly polarized light is incident thereto, the first linearly polarized light, and a recursive reflecting part that reflects incident light by converting the incident light into reflected light including only the first linearly polarized light.

In the above, the sensor main body preferably comprises a light projecting element, a light receiving element, and a first polarization filter that is placed on an optical path from the recursive reflecting part to the light receiving element and serves to selectively pass the first linearly polarized light therethrough.

The sensor main body may be contained in a case provided with a light transmitting part that serves both as a light projecting window and a light receiving window, the first polarization filter may be disposed so as to cover the light transmitting part, the light receiving element may be positioned so as to receive light in a direction transverse to the light projecting direction of the light projecting element, and the sensor main body may further include a half mirror that serves to pass either of projected light from the light projecting element and received light received by the light receiving element and to reflect the other of the projected light and the received light.

The light projecting element and the light receiving element may be in an amplifier part, the first polarization filter may be in a head part that is separate from the amplifier part, and the sensor main body may further include optical fibers that connect the amplifier part and the head part.

In the above, furthermore, the recursive reflecting part may include a reflector that reflects light recursively and a second polarization filter that is placed on light incident side of this reflector and serves to selectively allow said first linearly polarized light to pass therethrough.

In summary, this invention makes it possible to increase reliability of detection.

BRIEF DESCRIPTION OF THE DRAWINGS

FIG. 16, consisting of FIGS. 16A and 16B, shows problem points of the sensor main body of the double-lens type of the comparison example.

FIG. 17 is a diagonal view of a photoelectric sensor main body of the optical fiber type according to the third embodiment of this invention.

DETAILED DESCRIPTION OF THE INVENTION

The invention is described next by way of embodiments with reference to the drawings. For the convenience of description, like components are indicated by the same numerals and may not be explained repetitiously.

Figure 1:
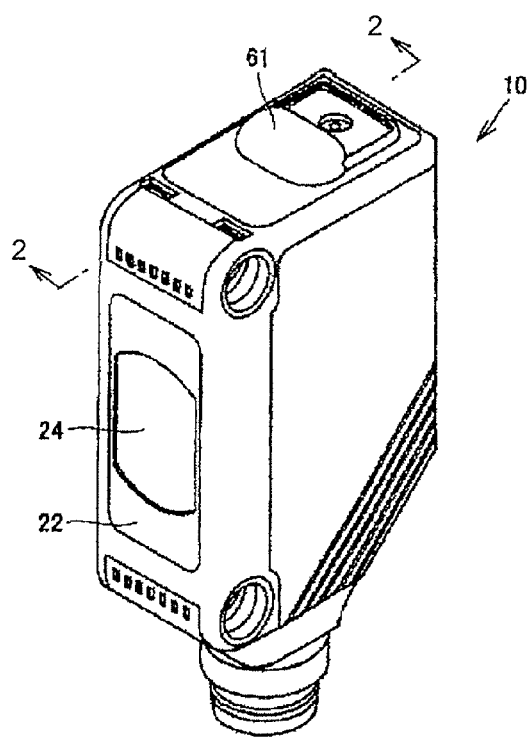
FIG. 1 is a diagonal view of the main body of a photoelectric sensor.
Figure 2:
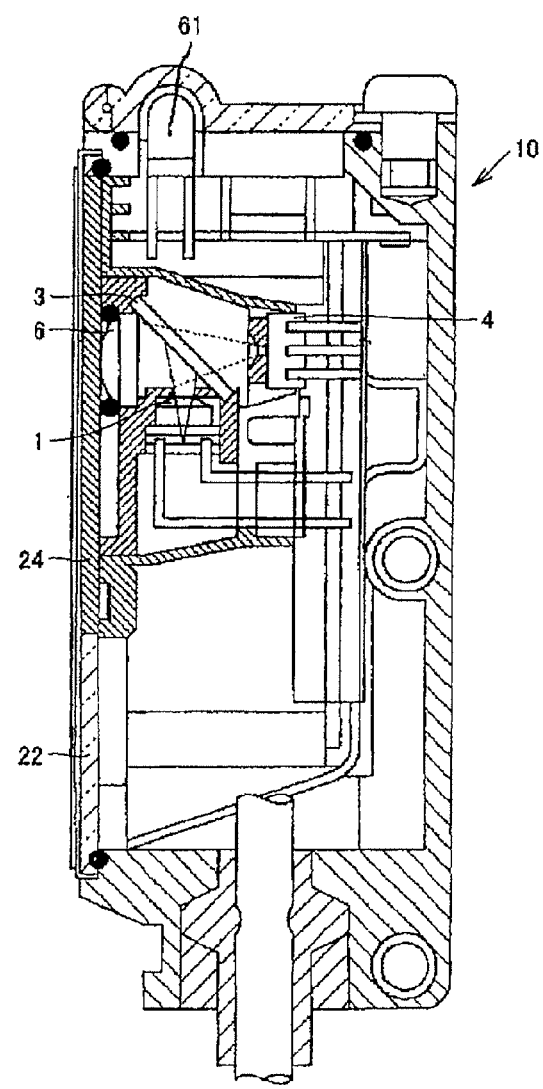
FIG. 2 is a sectional view of the interior of the photoelectric sensor according to a first embodiment of the invention taken along line 2-2 of FIG. 1.

FIG. 1 is a diagonal view of the main body 10 of a recursive-reflective photoelectric sensor of the coaxial type, and FIG. 2 is a sectional view of the interior of the photoelectric sensor according to a first embodiment of the invention taken along line 2-2 of FIG. 1.

The sensor main body 10 is provided on the front surface of its case with a window having a circularly polarizing plate (a polarization plate with a phase-shift plate) 24, held by a protective member 22 so as not to become disengaged and to fall off. A display lamp 61 is provided on the upper surface of the case for indicating a detection result.

A light projecting element 1 is disposed such that its light emitting part is at the focus of a lens 6 by the reflection by a half mirror 3. A light receiving element 4 is at a light receiving position which is the position of the focus of the lens 6 through the half mirror 3. The half mirror 3 is at an angle of 45° with respect to the light receiving axis and serves to pass a portion of received light.

The lens 6 and the half mirror 3 are optical members serving to project the light from the light projecting element 1 as a projected light beam towards a recursive-reflective plate (not shown) and to converge reflected light from the recursive-reflective plate onto the light receiving element 4 by means of the lens 6. The lens 6 serves to project the light from the light projecting element 1 as a parallel beam towards the recursive-reflective plate and to converge the reflected light onto the light receiving element 4. In FIG. 2, however, the positions of the light projecting element 1 and the light receiving element 4 may be reversed.

Since light traverses the circularly polarizing plate 24 twice (at times of projecting and receiving light), double refractions by the PET bottle, which were conventionally a cause of malfunctions, are made use of in converting the disturbance in the polarization condition caused by double refractions into the attenuation of light such that an optical system with high stability in the detection of PET bottles can be realized.

Figure 3:
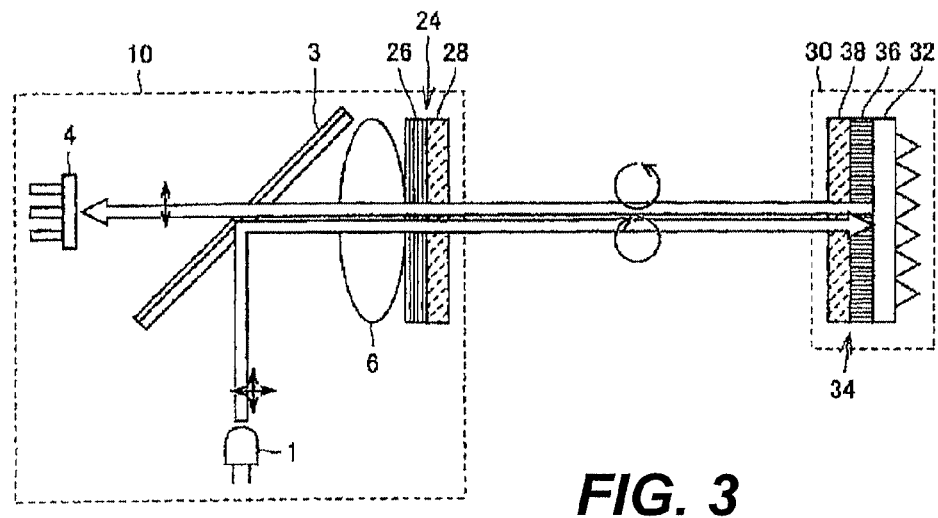
FIG. 3 is a conceptual diagram of the optical system of the first embodiment of the invention with its optical elements shown extracted.

FIG. 3 is a conceptual diagram of the optical system of the first embodiment of the invention with its optical elements shown extracted. As shown, a recursive-reflective photoelectric sensor according to the first embodiment of the invention comprises a sensor main body 10 forming therein a light projecting system that projects circularly polarized light and a light receiving system that selectively receives, when a mixture of inverse-circularly polarized light and circularly polarized light is made incident, the inverse-circularly polarized light and a recursive reflection part 30 that reflects circularly polarized light by converting it into light containing inverse-circularly polarized light.

The sensor main body 10 includes a light projecting element 1, a light receiving element 4, a half mirror 3, a lens 6 and a circularly polarizing plate 24. The circularly polarizing plate 24 includes a polarization filter 26 and a quarter-wave plate 28.

The recursive reflection part 30 includes a circularly polarizing plate 34 and a total reflector 32. The circularly polarizing plate 34 includes a polarization filter 36 and a quarter-wave plate 38. The polarization filters have an absorption axis and a transmission axis which is perpendicular to it, serving to pass linearly polarized light in the direction of the transmission axis and to absorb the other light components. The quarter-wave plates (or phase-shift plates) have a delay axis, serving to delay the phase of the polarization component in the direction of the delay axis by quarter-wavelength.

If linearly polarized light at an angle of 45° or −45° with respect to the delay axis is made incident to a quarter-wave plate, the linearly polarized light is converted into circularly polarized light. If circularly polarized light is made incident to a quarter-wave plate, the circularly polarized light is converted into linearly polarized light at 45° or −45° with respect to the delay axis. A circularly polarizing plate has a polarization filter and a quarter-wave plate pasted to each other with the absorption axis and the delay axis making an angle of 45° or −45° with respect to each other.

Figure 4:
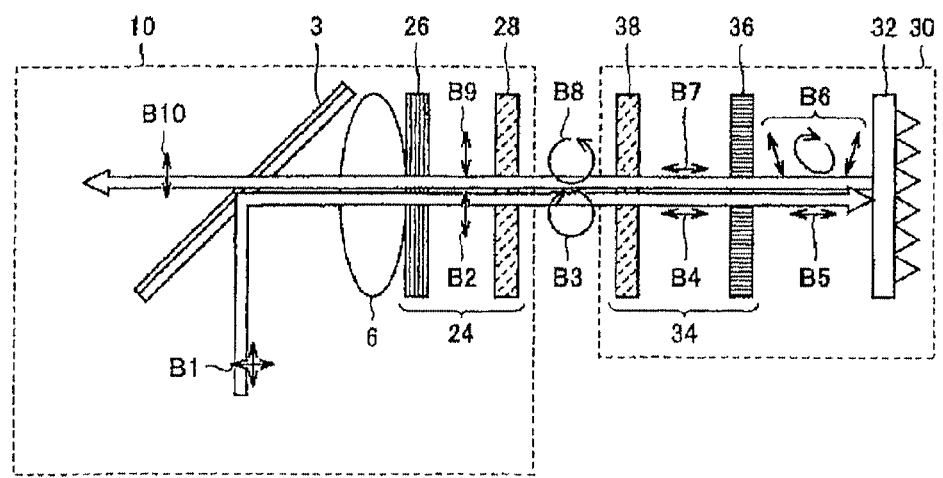
FIG. 4 is a drawing showing the polarization condition of each part of the optical system shown in FIG. 3.

FIG. 4 is a drawing showing the polarization condition of each part of the optical system shown in FIG. 3. FIG. 4 shows the sensor main body 10 as comprising the light projecting element 1, the light receiving element 4, a first phase-shift plate (quarter-wave plate 28) for converting first linearly polarized light (vertically polarized light B2) into first circularly polarized light B3 and second circularly polarized light (inverse circularly polarized light B8) into first linearly polarized light (vertically polarized light B9), and a first polarization filter 26. The first polarization filter 26 is placed between the light receiving element 4 and the first phase-shift plate (quarter-wave plate 28) on the light receiving path from the recursive reflection part 30 to the light receiving element 4 and serves to selectively pass the first linearly polarized light (vertically polarized light B2 and B10).

FIG. 4 shows the recursive reflection part 30 as comprising the total reflector 32 for recursively reflecting light, a second phase-shift plate (quarter-wave plate 38) for converting first circularly polarized light B3 to second linearly polarized light (horizontally polarized light B4) and second linearly polarized light (horizontally polarized light B7) to second circularly polarized light (inverse circularly polarized light B8), and a second polarization filter 36. The second polarization filter 36 is placed between the second phase-shift plate (quarter-wave plate 38) and the total reflector 32 on the light projecting path from the light projecting element 1 to the total reflector 32 and serves to selectively pass the second linearly polarized light (horizontally polarized light B5 and B7).

The quarter-wave plates 28 and 38 each have a certain directionality (in the direction of the delay axis), and circularly polarized light made incident thereto is converted into linearly polarized light with a specified direction of polarization. The polarization filters 26 and 36 are preliminarily pasted respectively to the quarter-wave plates 28 and 38 by means of a transparent adhesive such that the direction of polarization matches the directionality of the quarter-wave plates 28 and 38.

Although it is difficult to match the directions of two small components, it is much easier to paste a large sheet of polarization filter onto a large sheet of quarter-wave plate by matching their directions. Thus, large sheets of polarization filter and quarter-wave plate are pasted to each other first and punched by using a press to obtain members of a desired shape matching the shape of the window.

As shown in FIGS. 1 and 2, the sensor main body 10 is contained in a case having a light transmitting part serving both as a light projecting window and as a light receiving window. The phase-shift plate and the polarization filter are both positioned so as to cover this light transmitting part. The light receiving part is positioned such that the light receiving direction will be transverse to the direction of light projection by the light projecting element 1. The sensor main body 10 also includes the half mirror 3 for passing either of the projected and received light and reflecting the other.

Figure 5:
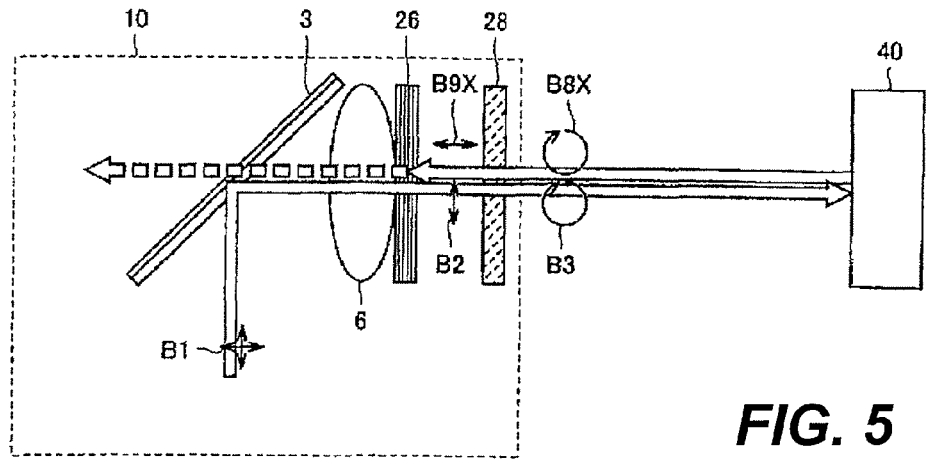
FIG. 5 is a drawing for explaining the elimination of reflected light from the sensor main body 10 according to the first embodiment of the invention.

FIG. 5 is a drawing for explaining the elimination of reflected light from the sensor main body 10 according to the first embodiment of the invention. As circularly polarized light B3 is projected from the light projecting part of the sensor main body 10, the light receiving part selects and receives the inverse circularly polarized light. The circularly polarized light B3 projected from the light projecting part onto a work piece 40 becomes regularly reflected light (circularly polarized light B8X) with no change in the polarization condition but since it is converted into horizontally polarized light by the quarter-wave plate 28, it does not pass through the polarization filter 26 and is not received.

Figure 6:
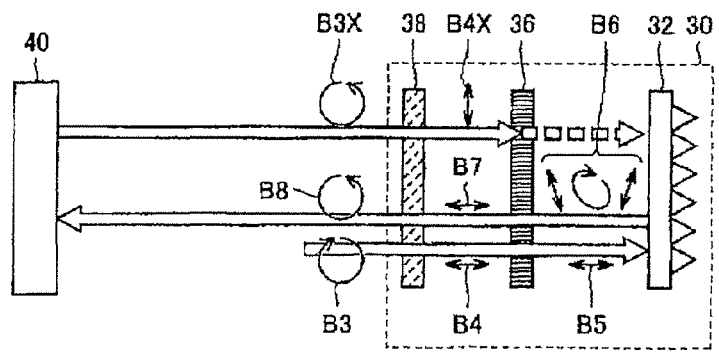
FIG. 6 is a drawing for explaining the elimination of reflected light by the recursive reflection part 30 according to the first embodiment of the invention.

FIG. 6 is a drawing for explaining the elimination of reflected light by the recursive reflection part 30 according to the first embodiment of the invention. FIG. 6 shows the recursive reflection part 30 as comprising the total reflector 32, the polarization filter 36 and the quarter-wave plate 38 placed in front of it. As circularly polarized light B3 is received by the recursive reflection part 30, it is converted into horizontally polarized light B4 by the quarter-wave plate 38 and passed through the polarization filter 36 such that horizontally polarized light B5 is made incident to the total reflector 32.

Reflected light B6 from the total reflector has its polarization condition converted, passes through the polarization filter 36 and has only its linearly polarized portion (horizontally polarized light B7) taken out. Thereafter, horizontally polarized light B7 passes through the quarter-wave plate 38 to become circularly polarized light B8 which is inverted from the circularly polarized light B3 made incident to the recursive reflection part 30. If inverse circularly polarized light B8, reflected from the recursive reflection part 30, is regularly reflected by a work piece 40 and is made incident to the recursive reflection part 30 again, this is circularly polarized light B3X inverse to the circularly polarized light B3 projected from the sensor main body. Inverse circularly polarized light B3X is converted to vertically polarized light B4X by the quarter-wave plate 38 and screened by the polarization filter 36.

The combination of the quarter-wave plate 38 and the polarization filter 36, which is used in this embodiment of the invention, is generally referred to as a circularly polarizing filter (circular polarization filter), a light isolator or a reflection-preventing filter. Instead of a quarter-wave plate, a combination of a plurality of wavelength (retardation) plates may be used for the same purpose. In recent years, in particular, there is an increased demand for reflection-preventing filters for a flat panel display and inexpensive products corresponding to a wide range of wavelengths are coming to be commercially available. These products may be used for constructing an optical system according to the present embodiment of this invention at a low cost.

Figure 7:
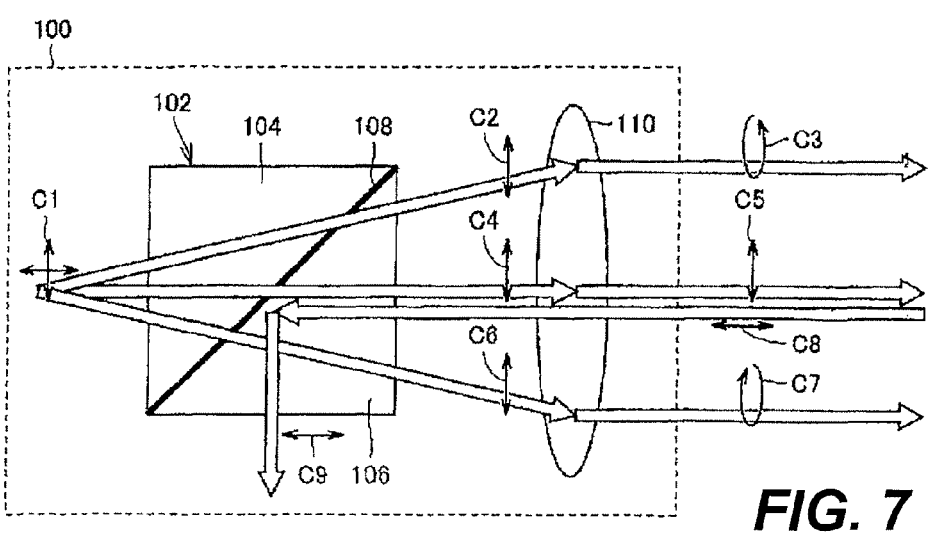
FIG. 7 is a drawing for explaining the problems associated with a sensor main body 100 using a polarization beam splitter serving as a comparison example.

FIG. 7 is a drawing for explaining the problems associated with a sensor main body 100 using a polarization beam splitter serving as a comparison example.

A beam splitter is generally used for controlling polarization in the case of a sensor of the coaxial type. The sensor main body 100 of FIG. 7 is characterizes as including a polarization beam splitter 102 and a lens 110. The cost of the polarization beam splitter 102 is much higher than that of a half mirror because it is necessarily of the structure having a thin film formed by vapor deposition on either of glass prisms 104 and 106 and having it sandwiched with the other. A half mirror is used if the control of polarization is not necessary in the case of a coaxial type. Since each sensor main body 10 shown in FIGS. 3-5 uses a half mirror, a structure such as a polarization beam splitter is not needed. The half mirror 3 can be made inexpensively by vapor deposition of thin film on a glass plate.

In the case of a coaxial optical system using a polarization beam splitter as shown in FIG. 7, furthermore, a lens is used in common by the light transmission part and the light receiving part. If the lens is used in common, light C1 emitted from a point source does not pass the polarization beam splitter 102 at a fixed angle, as indicated by light beams C2, C4 and C6.

For this reason, unlike the situation with light C5 with a correct polarization condition, a disturbance may occur in the polarization condition as shown by C3 and C7.

Figure 8:
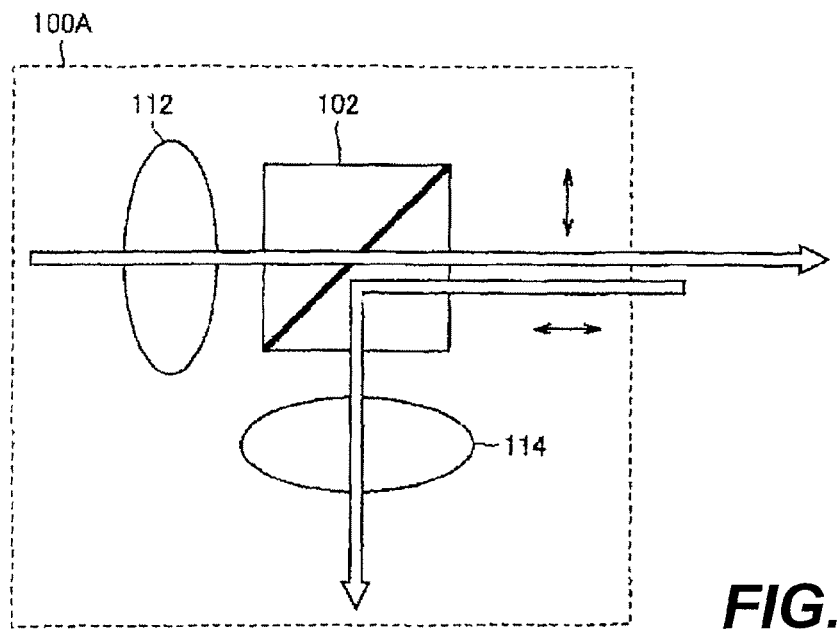
FIG. 8 is a drawing for showing an example for solving the problem of disturbances in polarization associated with the use of a polarization beam splitter.

FIG. 8 is a drawing for showing an example for solving the problem of disturbances in polarization associated with the use of a polarization beam splitter. FIG. 8 shows an example of sensor main body 100A having a polarization beam splitter 102 and a lens 112 set up such that a parallel beam is obtained by the lens 112 before light passes through the polarization beam splitter 102. In this example, however, another lens 114 becomes necessary for the light receiving part, and there arises the problem of the optical system becoming very large. The sensor main body 10 according to the first embodiment of the invention is capable of solving this problem compared to the example shown by FIG. 8.

Figure 9:
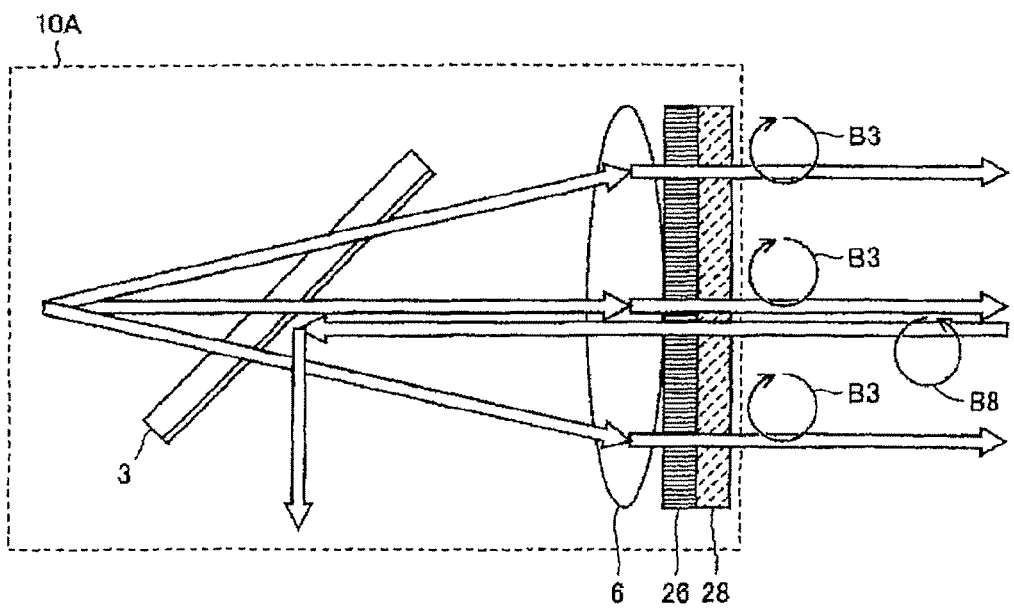
FIG. 9 is a drawing for showing the optical paths for another sensor main body 10A with the positions of the light projecting and receiving elements interchanged.

In the above, the positions of the light projecting and receiving elements may be interchanged. FIG. 9 is a drawing for showing the optical paths for a sensor main body 10A with the positions of the light projecting and receiving elements thus interchanged.

FIG. 9 shows the sensor main body 10A as comprising an optical system for a recursive-reflective photoelectric sensor of the coaxial type, having a half mirror 3 and only one lens 6, as well as a polarization filter 26 and a quarter-wave plate 28 placed in front of this lens 6. As a result, light emitted from its source becomes parallel by the lens 6 and clean circularly polarized light B3 comes to be projected. Thus, its regularly reflected light is screened off by the combination of the quarter-wave plate 28 and the polarization filter 26 which form an optical system for receiving only inverse circularly polarized light. In this manner, it is possible to realize a recursive-reflective photoelectric sensor of the coaxial type not receiving regularly reflected light, while obviating the problem of disturbances in polarization typical of a system using a polarization beam splitter.

Figure 10:
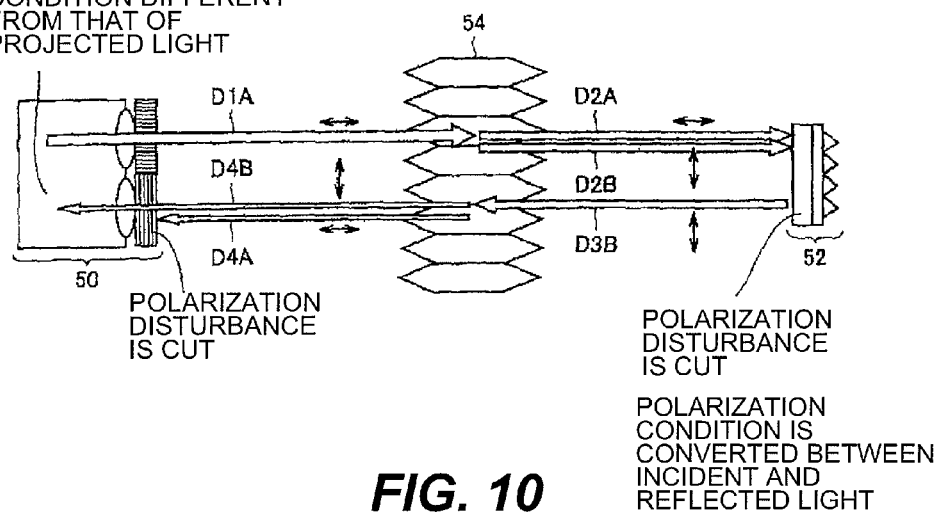
FIG. 10 is a conceptual diagram showing the attenuation of light intensity when a work piece enters the detection area.

Next, FIG. 10 will be referenced for explaining how to secure attenuation of light intensity when a work piece such as a PET bottle that causes double refractions enters the detection area of a recursive-reflective photoelectric sensor. Since the concept is common to structures of sensors of the double-lens type, FIG. 10 shows a sensor main part 50 of the double-lens type.

As shown in FIG. 10, the sensor main body 50 receives light with polarization condition different from that of the projected light. Its recursive reflection part 52 serves not only to cut the polarization disturbance due to a work piece but also to reflect the incident light by converting its polarization condition. If projected light is circularly polarized, "light with different polarization condition from projected light" indicated in FIG. 10 may be inverse circularly polarized light. If projected light is vertically or horizontally polarized light, it may be horizontally or vertically polarized light, respectively.

Thus, even if projected light D1A is split by double refraction into light D2A with the same polarization condition and light D2B with a different polarization condition as it passes through a work piece 54, the latter is cut off as it is made incident to the recursive reflection part 52. The former (D2A) is converted by the recursive reflection part 52 into reflected light D3B with a different polarization condition and made incident to the work piece 54 again. As it passes through the work piece 54, it is split again by double refraction into light D4A with the same polarization condition as light D3B and light D4A with a different polarization condition. The latter (D4A) is screened off as it is made incident to the sensor main body 50.

In summary, the light component, of which the polarization condition is changed by double refraction by the work piece 54, is cut off afterwards as it is made incident to the recursive reflection part 52 or the sensor main body 50. Since the quantity of received light decreases as the work piece 54 is inserted into the optical path, the detection of the work piece 54 becomes easier.

Figure 11:
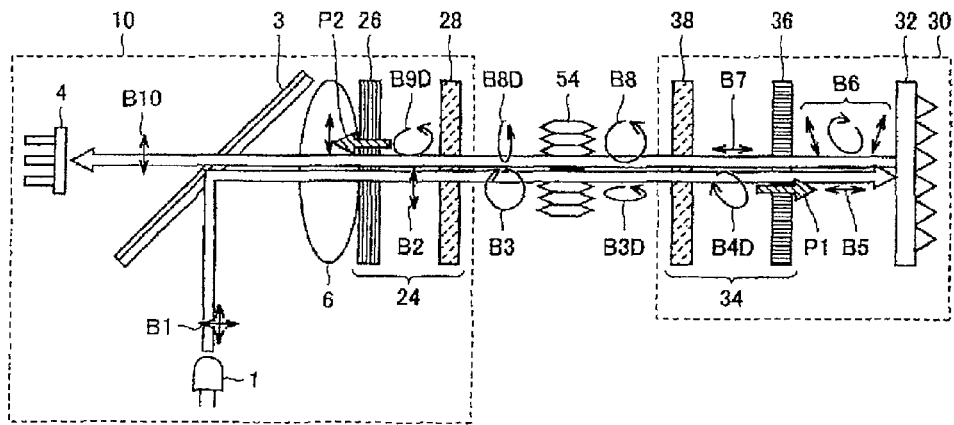
FIG. 11 is a drawing for showing the details of the concept of FIG. 10 in the case of the first embodiment of this invention.

FIG. 11 is for the purpose of explaining the concept of FIG. 10 more in detail for the case of the first embodiment of this invention. Since FIG. 11 is different from FIG. 4 only in that the work piece 54 such as a PET bottle adapted to cause double refraction is inserted, constituent elements of the sensor main body 10 and the recursive reflection part 30 are not described repetitiously.

As projected light B1 from the light projecting element 1 reaches the polarization filter 26, vertically polarized light B2 is selectively passed therethrough and it is converted by the quarter-wave plate 28 into circularly polarized light B3. A portion of this circularly polarized light B3 is converted, as it passes through the work piece 54, into light B3D with a disturbed polarization condition. Light B3D is converted into light B4D as it passes through the quarter-wave plate 38. Light B4D is cut off by the polarization filter 36 because its polarization condition is different from that of light B4 of FIG. 4. In other words, the light component with its polarization condition changed by double refraction is screened off at the position indicated by arrow P1 and only the component not affected by the double refraction reaches the total reflector 32 as horizontally polarized light B5.

Figure 23A:
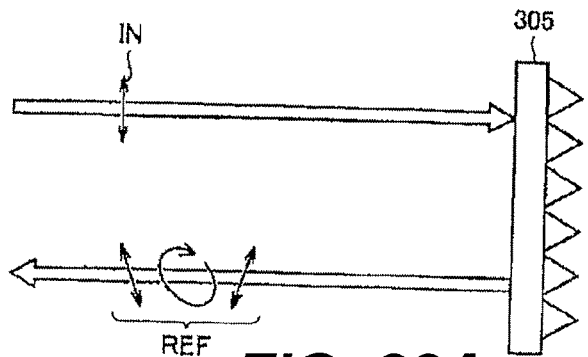
FIG. 23, consisting of FIGS. 23A and 23B, shows a first example of polarization conversion that takes place on a reflector.
Figure 23B:
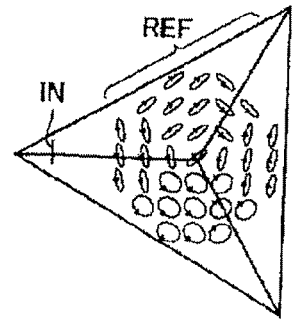
Figure 24A:
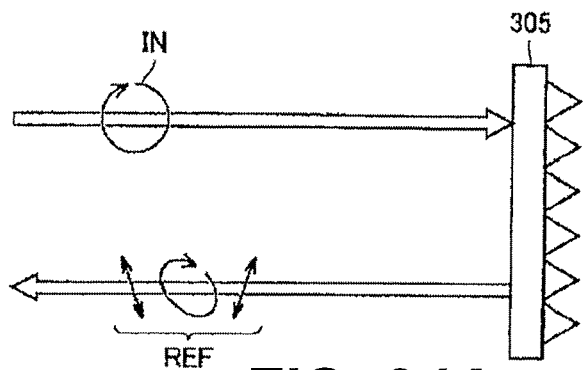
FIG. 24, consisting of FIGS. 24A and 24B, shows a second example of polarization conversion that takes place on a reflector.
Figure 24B:
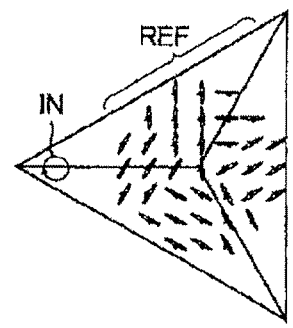
Figure 25:
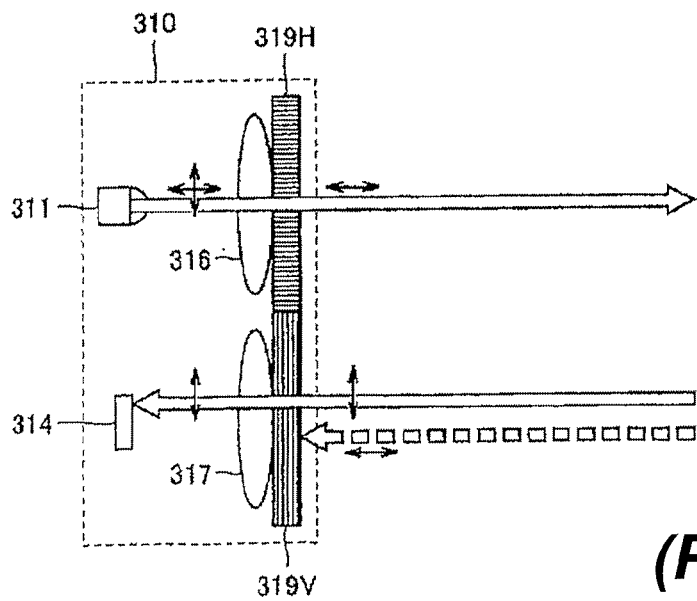
FIG. 25 is a drawing of an example of the structure of a sensor main body of a double-lens type.
Figure 26:
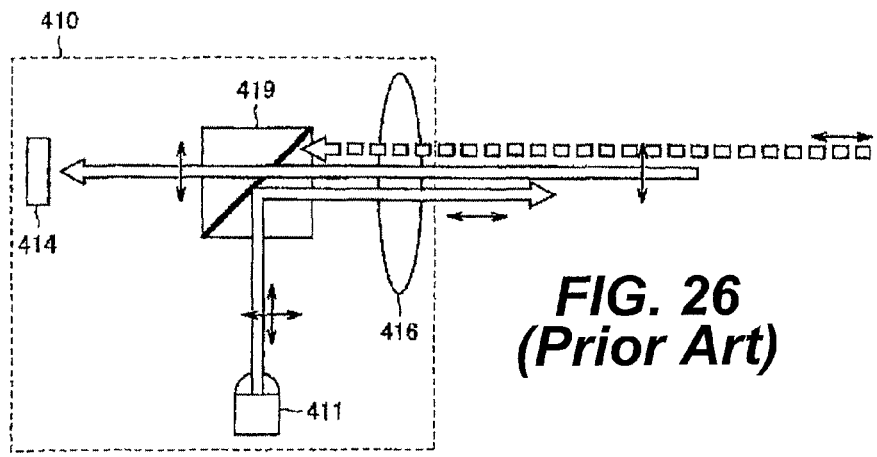
FIG. 26 is a drawing of a first example of the structure of a sensor main body of a coaxial type.
Figure 27:
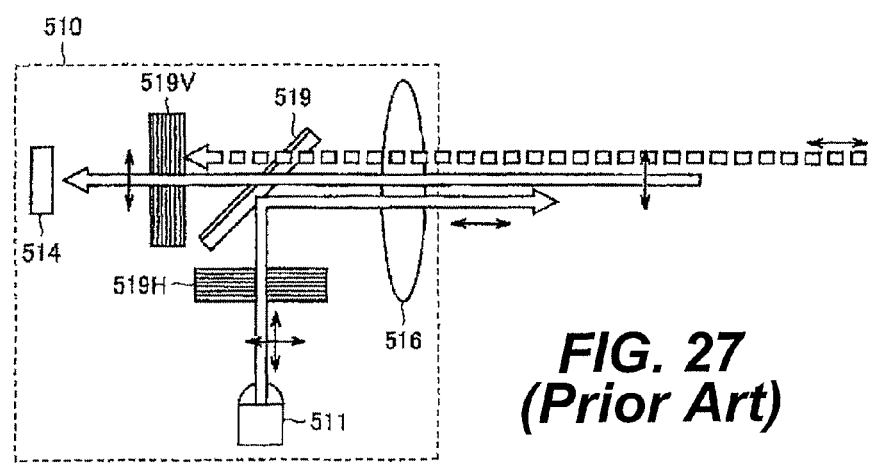
FIG. 27 is a drawing of a second example of the structure of a sensor main body of a coaxial type.
Figure 28:
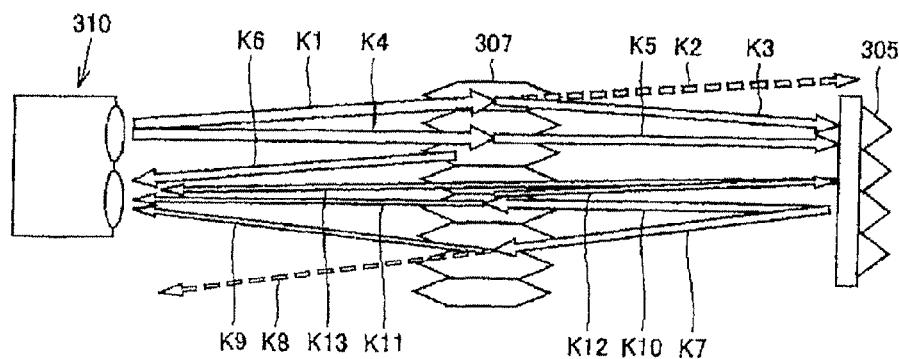
FIG. 28 is a drawing for explaining the effects of light reflection and convergence by a PET bottle.
Figure 29A:
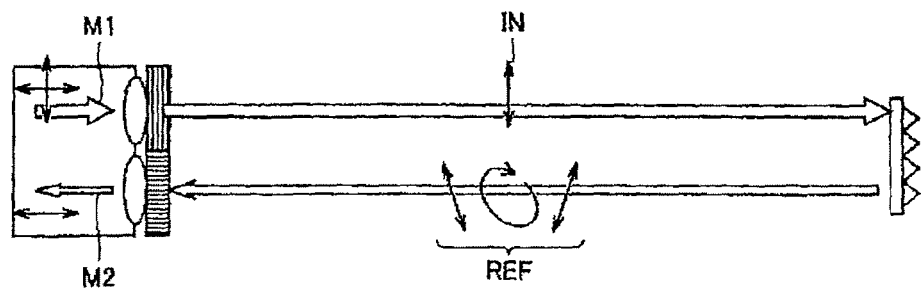
FIG. 29, consisting of FIGS. 29A and 29B, is a drawing for explaining the effects of double refractions.
Figure 29B:
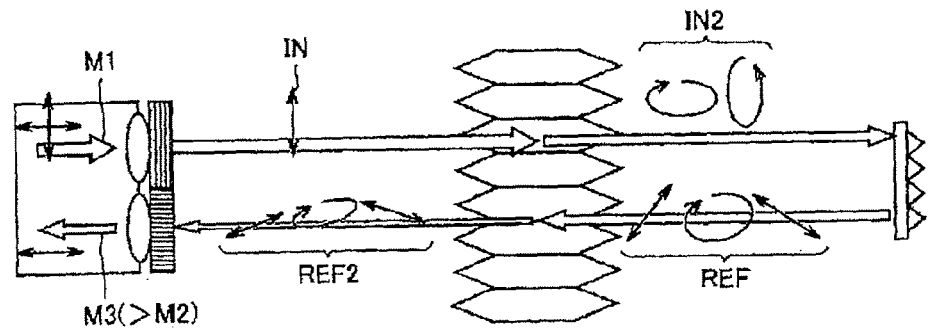

A change in the polarization condition takes place by the total reflector 32, as explained above with reference to FIGS. 23 and 24, to reflect light B6. Out of the components of this reflected light B6, only horizontally reflected light B7 is selectively passed through the polarization filter 36 and is converted into inverse circularly polarized light B8 by the quarter-wave plate 38.

As inverse circularly polarized light B8 is made incident to the work piece 54, one of its components is converted into light B8D having polarization disturbance. Light B8D passed through the quarter-wave plate 38 is converted into light B9D, which is cut off by the polarization filter 36 because its polarization condition is different from that of light B9 of FIG. 4. In other words, the light component with its polarization condition changed by double refraction is screened of at the position indicated by arrow P2 and only the component not affected by the double refraction reaches the light receiving element 4 as vertically polarized light B10.

Thus, the light components, of which the polarization condition is changed by double refraction by the work piece 54, are cut in two processes both in the path through the recursive reflection part 30 indicated by arrow P1 and in the path through the sensor main body 10 indicated by arrow P2. Since the quantity of receive light is reduced reliably as the work piece 54 is inserted in the optical path, the detection by the light receiving element 4 becomes much easier.

When light passes through a more or less transparent material, its intensity is decreased by about 10%. In the case of a hollow PET bottle described above, light intensity is decreased by about $1-0.9^4=34\%$. If polarized light is disturbed into the condition of random light by a PET bottle, by contrast, attenuation by light intensity by the optical system described above is 50% by the reflector and 50% by the sensor. Thus, the total attenuation by the optical system is $1-0.5^2 \times 0.9^4 = 84\%$. In principle, however, attenuation by 100% is conceivable by double refraction, depending on the condition of double refraction by the a target object for detection. Experimentally by an optical system of this invention, attenuation in the range of 98%-83% was observed.

Since circularly polarized light is projected and received, furthermore, the directions of the sensor main body and the recursive reflection part need not be precisely correlated according to this invention.

Figure 12:
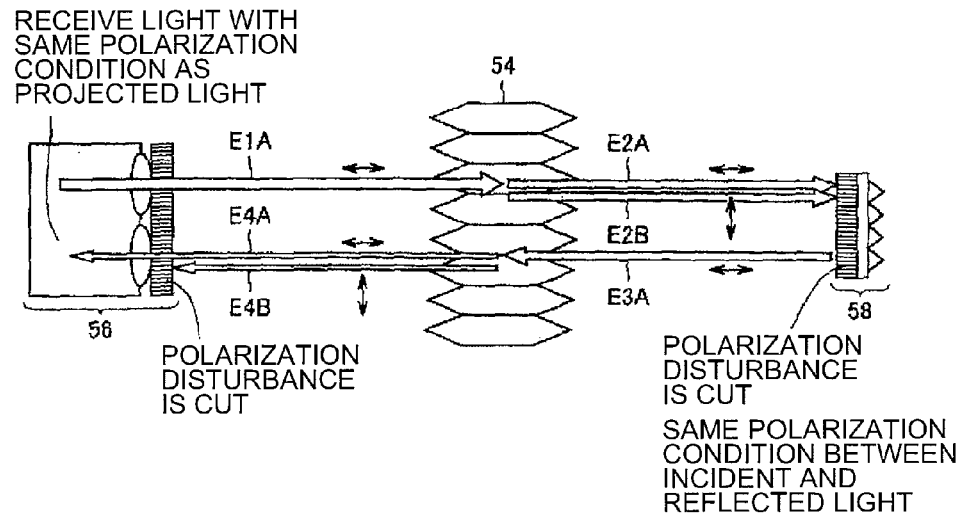
FIG. 12 is a conceptual diagram of an optical system according to a variation of the first embodiment of this invention.

Different optical systems are conceivable for converting disturbance of polarization due to an object with a double refraction characteristic into attenuation of light both on the sides of the sensor and the reflector. FIG. 12 is a conceptual diagram of an optical system according to a variation of the first embodiment of this invention, with a sensor main body 56 adapted to receive light with the same polarization condition as that of the transmitted light. Its recursive reflection part 58 server not only to cut the polarization disturbance caused by an inserted work piece 54 but also to reflect light with the same polarization condition as that of the incident light.

As a result, as the projected light E1A passes the work piece 54 and splits by its double refraction into light E2A with the same polarization condition and light E2B with different polarization condition, the latter (E2B) is cut as they are made incident to the recursive reflection part 58. The former (E2A) is reflected by the recursive reflection part 58 as reflected light E3A with the same polarization condition and is made incident again to the work piece 54. As it passes through the work piece 54, light E3A splits by double refraction into light E4a with the same polarization condition as that of the transmitted light E1A and light E4B with different polarization condition. The latter (E4B) is cut as they are made incident to the sensor main body 56.

In summary, since the light components, of which the polarization condition is converted by double refraction by the work piece 54, are cut later by the recursive reflection part and the sensor main part and the amount of received light decreases as the work piece 54 is inserted into the optical path, the detection of the work piece by the light receiving part becomes easier.

Figure 13:
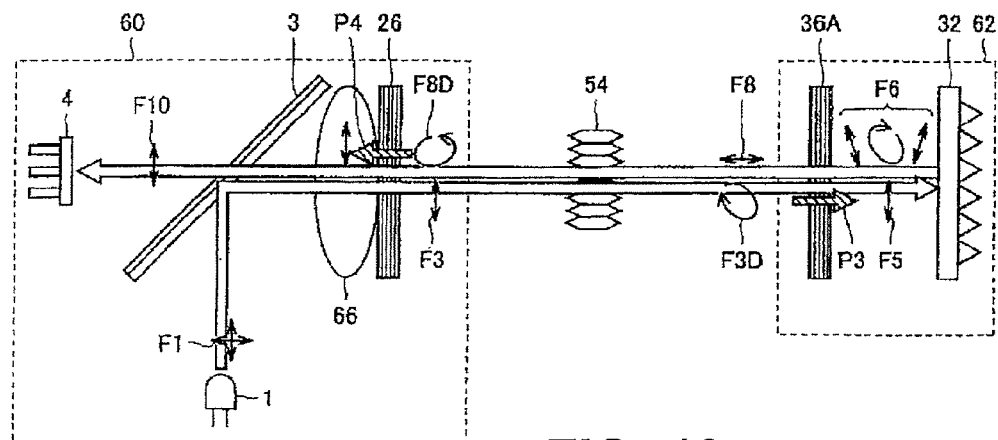
FIG. 13 is a more specific structural drawing of a sensor of the coaxial type.

FIG. 13 is a more specific structural drawing of a sensor of the coaxial type. The optical system shown in FIG. 13 is the same as that of FIG. 11 except that the quarter-wave plates 28 and 38 are removed and that the polarization filter 36 is replaced by another polarization filter 36A having the same direction of polarization as the polarization filter 26.

In this optical system, linearly polarized light F3 is projected and is made incident to the total reflector 32 through the polarization filter 36A in front of it. The polarization condition is converted by the total reflector 32 into reflected light F6 and only its linearly polarized component F8 passes through the polarization filter 36A to the sensor main body 60 and is received by the light receiving element 4 through the polarization filter 26.

If a work piece 54 with a double refraction characteristic is present, the polarization condition is thereby disturbed and the disturbed polarization components of disturbed projection light F3D are cut off by the polarization filter 36A in front of the total reflector 32 such that only the linearly polarized component F5 is made incident to the total reflector 32 and, as explained above, linearly polarized light F8 is reflected towards the sensor main body. The disturbed polarization components F8D of the reflected light by the work piece 54 are similarly cut by the polarization filter 26 of the sensor main body 60 such that only the linearly polarized component F10 is received by the light receiving element 4.

Although this optical system of FIG. 13, not using any phase-shift plate but using only polarization filters, has the demerit in that it is subject to ill effects of regularly reflected light from the work piece 54, attenuation of light occurs during processes indicated by arrow P3 and P4, and effects similar to those explained above with respect to FIG. 11 are obtained regarding double refractions.

As the first embodiment of the present invention, examples were explained above wherein the invention was applied to sensors of the coaxial type. Next, examples of applying the invention to sensors of the double-lens type are explained as the second embodiment of the invention. The basic concept is the same as explained above with reference to FIGS. 10 and 12 and hence will not be described repetitiously. Its recursive reflecting part is also the same and hence will not be explained repetitiously.

Figure 14:
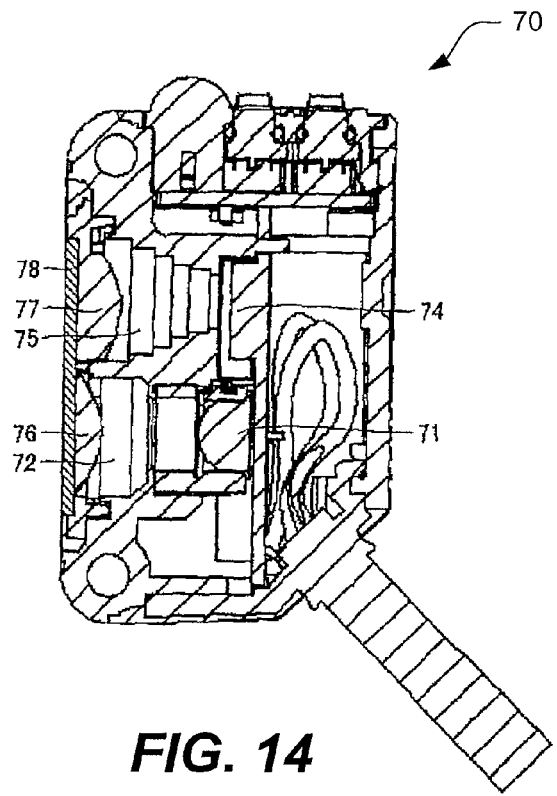
FIG. 14 is a sectional view of a sensor of a double-lens type embodying this invention.

FIG. 14 is a sectional view of a sensor of a double-lens type embodying this invention, showing a sensor main body 70 having a case provided in the front surface with a window to which a circularly polarizing plate 78 is inserted so as to cover a light receiving lens 77 and a light projecting lens 76 The light projecting lens 76 is supported by a holder member 72 of the light projecting part and the light receiving lens 77 is supported by a holder member 75 of the light receiving part. The light projecting element 71 is disposed such that its light emitting part is at the focus of the light projecting lens 76. The light receiving element 74 is at the focus of the light receiving lens 77. The light projecting lens 76 serves to project light from the light projecting element 71 as a parallel beam towards a recursive reflecting plate (not shown), and the light receiving lens 77 serves to converge the reflected light from the recursive reflecting plate parallel to the projected light beam at the light receiving element 74.

Although FIG. 14 shows an example with the light projecting part at a lower part and the light receiving part at an upper part of the sensor main body 70, their positions may be interchanged.

Figure 15A:
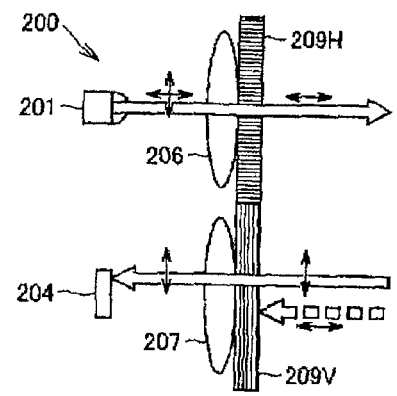
FIG. 15, consisting of FIGS. 15A, 15B and 15C, shows optical elements of the sensor main bodies of optical systems of the second embodiment of this invention and a comparison example.
Figure 15B:
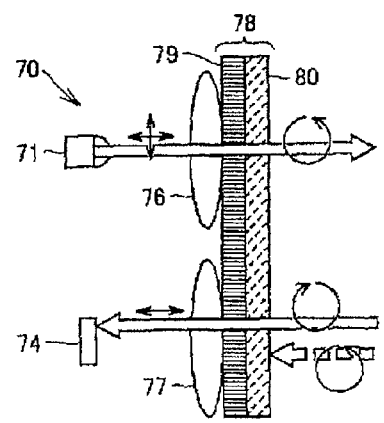
Figure 15C:
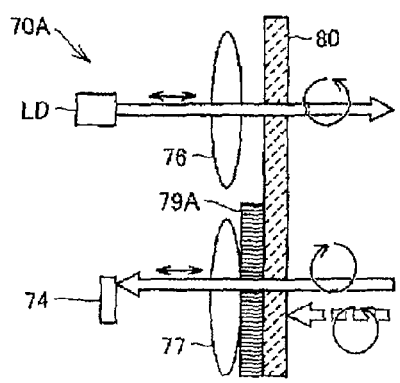

FIG. 15, consisting of FIGS. 15A, 15B and 15C, is for showing the optical elements of the sensor main bodies of optical systems of the second embodiment of this invention and a comparison example.

FIG. 15A shows a sensor main body 200 of the double-lens type as a comparison example, comprising a light projecting part inclusive of a light projecting element 201, a lens 206 and a polarization filter 209H having a horizontal polarization direction and a light receiving part inclusive of a polarization filter 209V having a vertical polarization direction, a lens 207 and a light receiving element 204.

FIG. 16, consisting of FIGS. 16A and 16B, shows problem points of the sensor main body of the double-lens type of the comparison example. If the polarization directions of the polarization filters 209H and 209V of FIG. 15A are correctly adjusted as shown in FIG. 16A, light that is regularly reflected by the work piece 40 is shut off by the polarization filter 209V and hence is not received. If the polarization directions of the polarization filters 209H and 209V of FIG. 15A are not correctly adjusted as shown in FIG. 16B, however, a portion of the light regularly reflected from the work piece 40 leaks through the polarization filter 209V and is received. As a result, the quantity of received light increases and this may cause an error in the detection.

The sensor main body 70 according to the second embodiment of the invention is shown in FIG. 15B. As shown in FIG. 14, it is contained in a case having a light projecting window and a light receiving window provided next to each other and includes not only the light projecting element 71, the light projecting lens 76, the light receiving lens 77 and the light receiving element 74 but also a quarter-wave plate 80 and a polarization filter 79 that are positioned so as to both cover the light projecting window and the light receiving window.

The quarter-wave plate 80 has a certain directionality (direction of the delay axis). If circularly polarized light is made incident, it is converted to linearly polarized light with a specified direction of polarization. The polarization filter 79 is preliminarily pasted onto the quarter-wave plate 80 by means of a transparent adhesive such that its direction of polarization matches the directionality of the quarter-wave plate 80.

With the structure shown in FIG. 15B, it becomes unnecessary to adjust the polarization direction of the polarization filter 79 for the sensor main body. Thus, the assembly of the sensor main body becomes easier. Since circularly polarized light is exchanged, the set positions of the sensor main body and the recursive reflecting part need not be strictly matched.

Thus, the second embodiment of this invention can properly address to the problem points of conventional recursive-reflective photoelectric sensors of the double-lens type related to the setting of the polarization filter for controlling polarization. Polarization filters are used for cutting regularly reflected light from a target object for detection to the light receiving part but their polarization directions had to be perpendicular to each other between the light projecting and receiving parts. If they are not perpendicular, regularly reflected light leaks and an error could occur in the case of a target object with a mirror surface, as explained above with reference to FIG. 16. This problem can be obviated by using the sensor of an optical system embodying this invention. If a combination of a polarization filter and a quarter-wave plate is placed in front of the light transmitting and receiving parts as explained above, regularly reflected light from a target object can be cut off and the problem of angular deviation related to polarization filters can also be obviated. The number of constituent components is also decreased and the number of steps in the assembly work can be reduced.

The sensor main body may be varied as shown in FIG. 15C. FIG. 15C shows another sensor main body 70A which is a variation of this invention and is the same as the sensor main body 70 except that it comprises another polarization filter 79A (instead of polarization filter 79) covering only the light receiving part and a laser diode LD for emitting linearly polarized light (instead of light transmitting element 71). The sensor main body 70A thus structured has the advantage in that the directions of the sensor main body and the recursive reflecting part need not be matched precisely although the polarization direction of the laser diode LD and the direction of the quarter-wave plate must be matched.

As the first embodiment of the invention, examples were described wherein the invention was applied to a sensor of the coaxial type. As the second embodiment of the invention, examples were descried wherein the invention was applied to a sensor of the double-lens type. This invention can also be applied to photoelectric sensors of the optical fiber type as the third embodiment. Since the concept of the third embodiment is essentially the same as explained above with reference to FIGS. 10 and 12, it will not be explained repetitiously. The recursive reflecting part is the same as for the first embodiment.

FIG. 17 is a diagonal view of a photoelectric sensor main body 150 of the optical fiber type according to the third embodiment of this invention, showing it as comprising an amplifier part 151, a head part 152 and optical fibers 162 and 163 that connect the amplifier part 151 and the head part 152. As can be seen, the sensor main body 150 is separated into the amplifier part 151 and the head part 152. In other words, the sensor main body 150 need not be a single body but may have two or more physically separated parts. Although not precisely illustrated, a light projecting element and a light receiving element are included in the amplifier part 151. A phase-shift plate and a polarization filter are in the head part 152, separated from the amplifier part 151.

FIG. 17 shows the sensor main body 150 with its transparent upper cover 172 opened. The light projecting optical fiber 162 and the light receiving optical fiber 163 are inserted to the front part of a box member 171 made of a plastic material, being fastened by the operation of a clamp lever 173. An electric cord 164 is pulled out from the back part of the box member 171. The electric cord 164 includes a core line for grounding, a core line for a positive power source, a core line for detection output and a core line for diagnostic output.

The transparent upper cover 172 is attached to the box member 171 such that it can be opened and closed. Display devices 175 and 176, operating buttons 177, 178 and 179 and slide operators 180 and 181 are provided on the upper surface of the box member 171 which becomes exposed when the upper cover 172 is in the opened condition.

Figure 18:
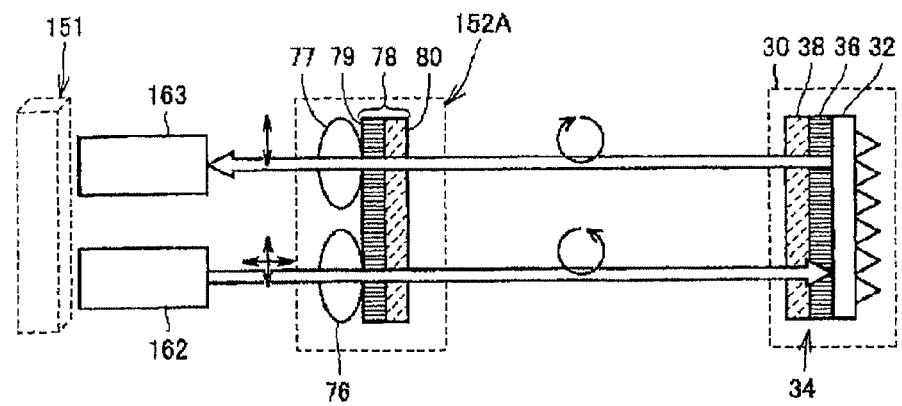
FIG. 18 is a schematic diagram for explaining the first structural example of the head part 152 of FIG. 17.

FIG. 18 is a schematic diagram for explaining the first structural example of the head part 152 of FIG. 17, showing the light projecting and receiving optical fibers 162 and 163 connected to the head part 152A.

The head part 152A contains a light projecting lens 76, a light receiving lens 77 and a circularly polarizing plate 78 including a quarter-wave plate 80 and a polarization filter 79. The quarter-wave plate 80 and the polarization filter 79 are both disposed so as to cover the light projecting and receiving windows of the head part 152A. The structure of this head part 152A corresponds to that of the photoelectric sensor of the double-lens type shown in FIG. 15B.

Light that is projected from the light projecting optical fiber 162 through the polarization filter 79 and the quarter-wave plate 80 towards the recursive reflecting part 30 is circularly polarized.

The recursive reflecting part 30 contains a circularly polarizing plate 34 and a total reflector 32. The circularly polarizing plate 34 includes a polarization filter 36 and a quarter-wave plate 38. As the recursive reflecting part 30 reflects circularly polarized light, it is converted into inversely circular polarized light traveling towards the head part 152A. As it passes through the circularly polarizing plate 78 of the head part 152A, the inversely circular polarized light is converted into vertically polarized light and made incident to the light receiving fiber 163.

Figure 19:
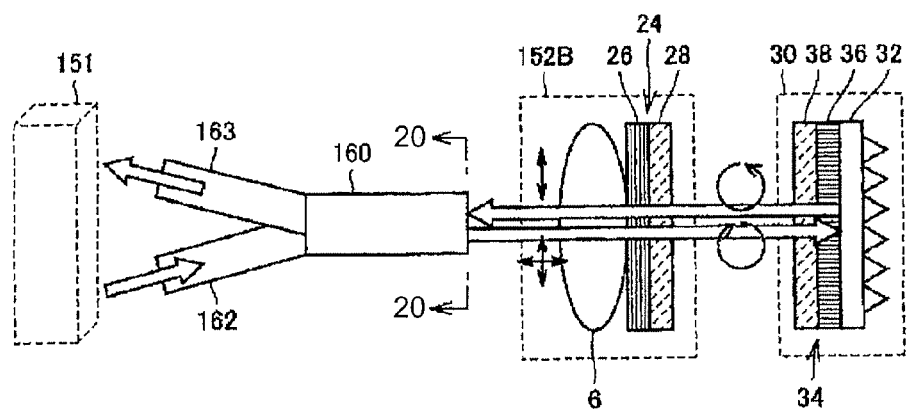
FIG. 19 is a schematic diagram for explaining the second structural example of the head part 152 of FIG. 17.

FIG. 19 is a schematic diagram for explaining the second structural example of the head part 152 of FIG. 17, showing another head part 152B connected to a combined (unified) optical fiber 160 combining the light projecting optical fiber 162 and the light receiving optical fiber 163. The head part 152B is provided with a lens 6 and a circularly polarizing plate 24 including a quarter-wave plate 28 and a polarization filter 26. The structure of this head part 152B corresponds to that of the photoelectric sensor shown in FIG. 3.

Figure 20:
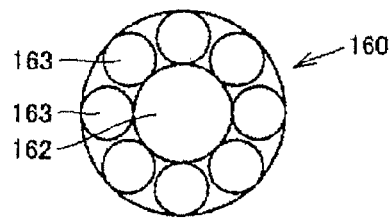
FIG. 20 is a sectional view of the optical fiber 160 of FIG. 19 taken along line 20-20.
Figure 21:
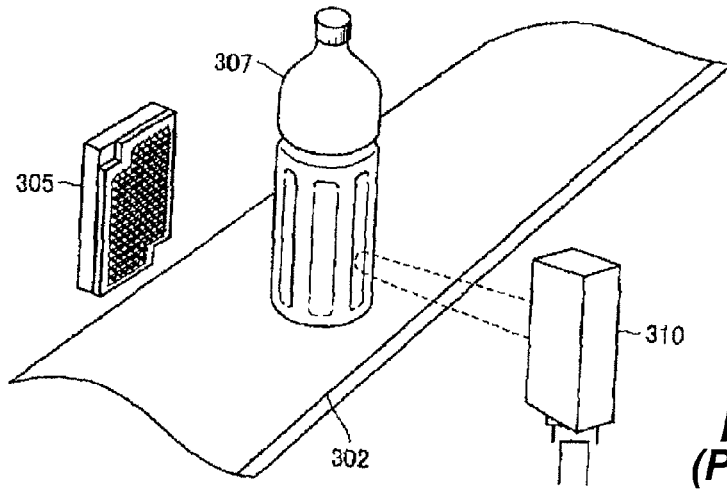
FIG. 21 is a drawing showing a recursive-reflective photoelectric sensor being in use.
Figure 22A:
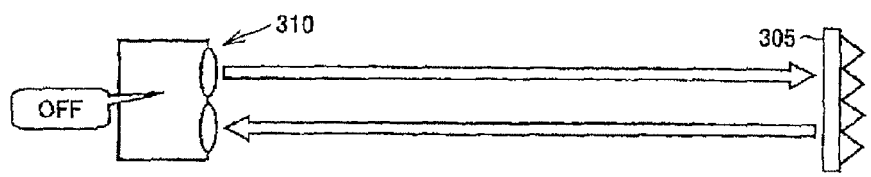
FIG. 22, consisting of FIGS. 22A, 22B, 22C and 22D, is a schematic drawing for explaining the detection operations of the recursive-reflective photoelectric sensor for target objects of different kinds.
Figure 22B:
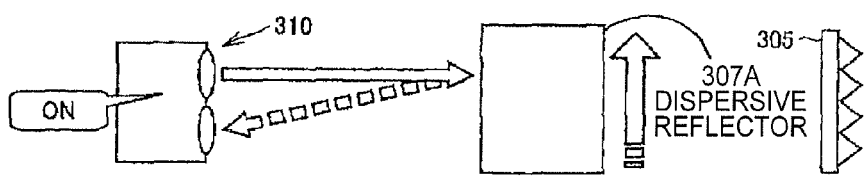
Figure 22C:
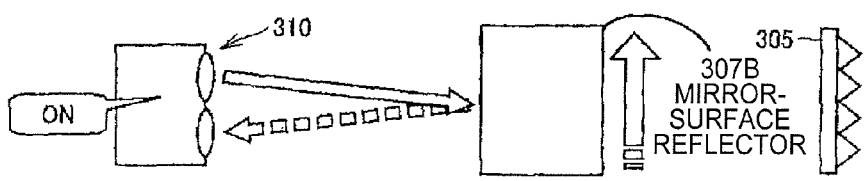
Figure 22D:
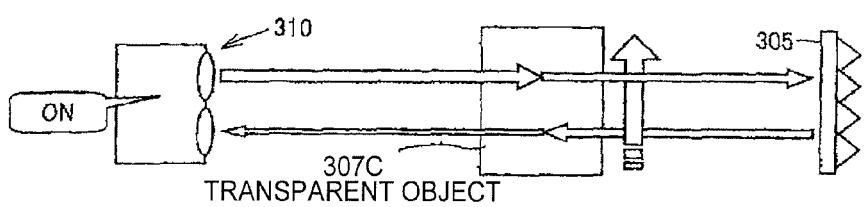

FIG. 20 is a sectional view of the optical fiber 160 of FIG. 19 taken along line 20-20.

The optical fiber 160 of FIGS. 19 and 20 has a light projecting optical fiber 162 at the center, surrounded by a plurality of light receiving optical fibers 163. At an end part near the amplifier part 151, the light receiving optical fibers 163 are separated from the light projecting optical fiber 162 and inserted into the connector opening on the side of the light receiving element. The light projecting optical fiber 162 is inserted to another connector opening on the side of the light projecting element.

Light that is projected from the light projection optical fiber 162 through the polarization filter 26 and the quarter-wave plate 28 towards the recursive reflecting part 30 is circularly polarized.

The recursive reflecting part 30 contains a circularly polarizing plate 34 and a total reflector 32. The circularly polarizing plate 34 includes a polarization filter 36 and a quarter-wave plate 38. As the recursive reflecting part 30 reflects circularly polarized light, it is converted into inversely circular polarized light traveling towards the head part 152B. As it passes through the circularly polarizing plate 24 of the head part 152B, the inversely circular polarized light is converted into vertically polarized light and made incident to the light receiving fiber 163.

According to the third embodiment of this invention, too, unwanted noise components such as reflected light from other than the reflector are eliminated such that the quantity of light received by the light receiving element is reliably reduced and hence the detection by the light receiving part becomes easier. Reliable results are also obtainable by removing the quarter-wave plates from the sensor main body and the reflector, as shown in FIGS. 18 and 19.

Although the invention has been described above with reference to only a limited number of embodiments, they are not intended to limit the scope of this invention. They are intended merely to be illustrative, and many modifications and variations that may be apparent to a person skilled in the art are intended to be within the scope of this invention.

What is claimed is:

1. A recursive-reflective photoelectric sensor comprising:
    a sensor main body including a light projecting part that projects first circularly polarized light and a light receiving part that selectively receives, when a mixture of the first circularly polarized light and second circularly polarized light which is differently polarized from said first circularly polarized light is incident thereto, said second circularly polarized light; and
    a recursive reflecting part that reflects said first circularly polarized light by converting into reflected light that includes said second circularly polarized light;
    wherein said sensor main body includes:
    a light projecting element;
    a light receiving element;
    a first phase-shift plate that converts first linearly polarized light into said first circularly polarized light and said second circularly polarized light into said first linearly polarized light; and
    a first polarization filter that is placed between said light receiving element and said first phase-shift plate on a optical path from said recursive reflecting part to said light receiving element and serves to selectively allow said first linearly polarized light to pass therethrough.

2. The recursive-reflective photoelectric sensor of claim 1 wherein said sensor main body is contained in a case provided with a light transmitting part that serves both as a light projecting window and a light receiving window;
    both said phase-shift plate and said first polarization filter are positioned so as to cover said light transmitting part;
    said light receiving element is positioned so as to receive light in a direction transverse to the light projecting direction of said light projecting element; and
    said sensor main body further includes a half mirror that serves to pass either projected light from said light projecting element and received light received by said light receiving element and to reflect the other of said projected light and said received light.

3. The recursive-reflective photoelectric sensor of claim 1 wherein said sensor main body is contained in a case provided with a light projecting window and a light receiving window formed next to each other; and said first phase-shift plate and said first polarization filter are both positioned so as to cover said light projecting window and said light receiving window.

4. The recursive-reflective photoelectric sensor of claim 1 wherein said sensor main body is contained in a case provided with a light projecting window and a light receiving window formed next to each other;
   said first phase-shift plate is positioned so as to cover said light projecting window and said light receiving window;
   said first polarization filter is positioned so as to cover said light receiving window; and
   said light projecting element comprises a laser projecting element that projects said first linearly polarized light.

5. The recursive-reflective photoelectric sensor of claim 1 wherein said light projecting element and said light receiving element are in an amplifier part;
   said first phase-shift plate and said first polarization filter are in a head part that is separate from said amplifier part; and
   said sensor main body further includes optical fibers that connect said amplifier part and said head part.

6. The recursive-reflective photoelectric sensor of claim 1 wherein said recursive reflecting part comprises:
   a reflector that recursively reflects light;
   a second phase-shift plate that converts said first circularly polarized light into second linearly polarized light and said second linearly polarized light into said second circularly polarized light; and
   a second polarization filter that is placed between said second phase-shift plate and said reflector on an optical path from said light projecting element to said reflector and serves to selectively allow said second linearly polarized light to pass therethrough.

7. A sensor main body of a recursive-reflective photoelectric sensor, said sensor main body comprising:
   a light projecting element;
   a light receiving element;
   a phase-shift plate that converts linearly polarized light into first circularly polarized light and second circularly polarized light, which is differently polarized from said first circularly polarized light, into said linearly polarized light; and
   a polarization filter that is placed between said light receiving element and said phase-shift plate on an optical path from a recursive reflecting part to said light receiving element and serves to selectively allow said linearly polarized light to pass therethrough.

8. The sensor main body of claim 7 wherein said sensor main body is contained in a case provided with a light transmitting part that serves both as a light projecting window and a light receiving window,
   both said phase-shift plate and said polarization filter are positioned so as to cover said light transmitting part;
   said light receiving element is positioned so as to receive light in a direction perpendicular to the light projecting direction of said light projecting element; and
   said sensor main body further includes a half mirror that serves to pass either of projected light from said light projecting element and received light received by said light receiving element and to reflect the other of said projected light and said received light.

9. The sensor main body of claim 7 wherein said sensor main body is contained in a case provided with a light projecting window and a light receiving window formed next to each other; and
   said phase-shift plate and said polarization filter are both positioned so as to cover said light projecting window and said light receiving window.

10. The sensor main body of claim 7 wherein the sensor main body is contained in a case provided with a light projecting window and a light receiving window formed next to each other;
    said phase-shift plate is positioned so as to cover said light projecting window and said light receiving window;
    said polarization filter is positioned so as to cover said light receiving window; and
    said light projecting element comprises a laser projecting element that projects said linearly polarized light.

11. The sensor main body of claim 7 wherein said light projecting element and said light receiving element are in an amplifier part;
    said phase-shift plate and said polarization filter are in a head part that is separate from said amplifier part; and
    said sensor main body further includes optical fibers that connect said amplifier part and said head part.

12. A recursive reflecting part of a recursive-reflective photoelectric sensor, said recursive reflective part comprising:
    a reflector that reflects light recursively;
    a phase-shift plate that converts first circularly polarized light into linearly polarized light and said linearly polarized light into second circularly polarized light; and
    a polarization filter that is placed between said phase-shift plate and said reflector on an optical path from a sensor main body to said reflector and selectively passes said linearly polarized light therethrough.

* * * * *